United States Patent
Yu et al.

(10) Patent No.: US 8,421,397 B2
(45) Date of Patent: Apr. 16, 2013

(54) SYSTEM AND METHOD FOR FAST START-UP OF AN INDUCTION MOTOR

(75) Inventors: Anbo Yu, ShenZhen (CN); Lei Zhang, ShenZhen (CN); Kevin Lee, Menomonee Falls, WI (US)

(73) Assignee: Eaton Corporation, Cleveland, OH (US)

( * ) Notice: Subject to any disclaimer, the term of this patent is extended or adjusted under 35 U.S.C. 154(b) by 213 days.

(21) Appl. No.: 13/083,849

(22) Filed: Apr. 11, 2011

(65) Prior Publication Data

US 2012/0256580 A1    Oct. 11, 2012

(51) Int. Cl.
*H02P 1/26* (2006.01)

(52) U.S. Cl.
USPC ............ 318/779; 318/778; 318/801; 318/811

(58) Field of Classification Search .................. 318/727, 318/778, 779, 800, 801, 807, 810, 811
See application file for complete search history.

(56) References Cited

U.S. PATENT DOCUMENTS

| | | | | |
|---|---|---|---|---|
| 4,451,112 | A | * | 5/1984 | Hattori et al. .................. 318/778 |
| 5,010,287 | A | * | 4/1991 | Mukai et al. ................... 318/801 |
| 5,066,899 | A | * | 11/1991 | Nashiki .......................... 318/807 |
| 5,461,296 | A | * | 10/1995 | Messersmith et al. ........ 318/779 |
| 5,574,352 | A | | 11/1996 | Endo et al. |
| 5,844,397 | A | * | 12/1998 | Konecny et al. .............. 318/811 |
| 7,233,125 | B2 | | 6/2007 | Ramamoorthy et al. |
| 7,932,693 | B2 | * | 4/2011 | Lee et al. ...................... 318/802 |

FOREIGN PATENT DOCUMENTS

| | | |
|---|---|---|
| JP | 53037809 A | 4/1978 |
| JP | 57135699 A | 8/1982 |
| JP | 61207179 A | 9/1986 |
| JP | 62104489 A | 5/1987 |
| JP | 2000228888 A | 8/2000 |
| KR | 817116 B1 | 3/2008 |
| KR | 823725 B1 | 4/2008 |
| WO | 9750162 A1 | 12/1997 |

OTHER PUBLICATIONS

"3-Phase AC Motor Control with V/Hz Speed Closed Loop Using the 56F800/E: Design of a Motor Control Application Based on Processor Expert," Freescale Semiconductor Application Note, AN1958, Rev. 0, Jul. 2005, pp. 1-36.

Lucas et al., "A 3-Phase ac Induction Motor Control System Based on the MC68HC908MR32," Freescale Semiconductor Application Note, AN1857, 2004, pp. 1-52.

* cited by examiner

*Primary Examiner* — Bentsu Ro
*Assistant Examiner* — Thai Dinh
(74) *Attorney, Agent, or Firm* — Ziolkowski Patent Solutions Group, SC

(57) ABSTRACT

A system for controlling operation of a motor drive during fast start-up of an induction motor is disclosed. The system includes an AC motor drive having a PWM inverter and a control system to generate a command signal to cause the PWM inverter to control an output of the AC motor drive. The control system includes a start-up modulator that is selectively operable during start-up acceleration of the AC motor, the start-up modulator programmed to determine a motor current applied to the AC motor and a voltage of a DC bus, generate a first frequency offset that causes a frequency reference of the command signal to be decreased when the motor current is greater than a reference current threshold, and generate a second frequency offset that causes the frequency reference of the command signal to be increased when the DC bus voltage is greater than a reference voltage threshold.

20 Claims, 4 Drawing Sheets

SYSTEM AND METHOD FOR FAST START-UP OF AN INDUCTION MOTOR

BACKGROUND OF THE INVENTION

The present invention relates generally to alternating current (AC) induction motors and, more particularly, to a system and method for controlling operation of a motor drive during fast start-up of an induction motor.

The usage of motor drives in various industries has become more prevalent based on the increasing need for energy savings and control flexibility in operation of induction motors. Based on these needs, improvements in motor control performance have become increasingly important. One such example of a need for improved motor control performance is when fast start-up of an induction motor is desired. When operating an adjustable-speed motor drive (ASD) to start an induction motor, users have options to set an acceleration time for bringing the motor up to a desired reference speed. This acceleration time can be as fast as 0.1 s from the motor's zero speed to the desired speed.

However, several issues/drawbacks are inherent when performing such a fast start-up of the induction motor. For example, due to inherent rotor inertia (as well as load inertia), a slip occurs in the motor during the acceleration process. If the system inertia, and the corresponding motor slip, is too large, an over-current phenomenon can occur that causes an associated over-current trip fault in the motor. Another issue/drawback associated with fast start-up of the induction motor is the possibility for an over-voltage occurrence where the induction motor is caused to operate in a power generation mode. That is, at the end of the acceleration process, at the moment when the actual speed of the induction motor reaches the desired speed reference set point, the motor current will not change immediately due to the existence of stator inductance in the motor. The electromagnetic torque is thus still larger than the load torque and this causes the actual speed of the motor to continue to rise to a level above its reference speed, thereby causing the induction motor to operate in a power generating mode. The energy stored in the induction machine will be fed back through the inverter of the ASD, such that a DC link voltage of the ASD is boosted. The boosted voltage present on the DC link may cause an over-voltage trip in the ASD when an over-voltage threshold is reached.

The over-current and over-voltage trip faults that can occur during start-up of the induction motor are undesirable. Such over-current and over-voltage trip faults can cause delays in bringing the motor up to the desired speed and can disrupt the power production process.

It would therefore be desirable to design a system and method for controlling operation of an ASD during fast start-up of an induction motor. It would further be desirable for such a system and method to provide for achieving a smooth start-up of the induction machine without disrupting the operation thereof due to over-current and over-voltage trip faults.

BRIEF DESCRIPTION OF THE INVENTION

The present invention provides a system and method for controlling operation of a motor drive during fast start-up of an induction motor.

In accordance with one aspect of the invention, a system to control operation of an AC motor includes an AC motor drive having an input connectable to an AC source and an output connectable to an input terminal of an AC motor, with the AC motor drive further including a rectifier connected to the input, a pulse width modulation (PWM) inverter connected to the rectifier by way of a DC bus and having a plurality of switches therein to control current flow and terminal voltages in the AC motor, and a control system connected to the PWM inverter being configured to generate a command signal to cause the PWM inverter to control an output of the AC motor drive corresponding to the input to the AC motor, with the command signal including a frequency reference and a voltage reference. The control system includes a start-up modulator that is selectively operable during a start-up acceleration of the AC motor to a desired reference speed, with the start-up modulator being programmed to determine each of a motor current applied to the AC motor and a voltage of the DC bus, generate a first frequency offset that causes the frequency reference of the command signal to be decreased when the motor current is greater than a reference current threshold, and generate a second frequency offset that causes the frequency reference of the command signal to be increased when the DC bus voltage is greater than a reference voltage threshold.

In accordance with another aspect of the invention, a method for controlling operation of an AC motor during acceleration of the AC motor in a start-up mode of operation by way of a motor drive includes the step of generating a command signal in a control system of the motor drive based on a desired speed of the AC motor, the command signal including a frequency reference and a voltage reference. The method also includes the steps of transmitting the command signal to a pulse width modulation (PWM) inverter of the motor drive to control an output of the PWM inverter so as to thereby control current flow and terminal voltages in the AC motor and incrementally adjusting the command signal transmitted to the PWM inverter during the start-up mode of operation based on a motor current applied to the AC motor and a voltage an a DC bus of the motor drive. The step of incrementally adjusting the command signal further includes determining each of the motor current applied to the AC motor and the DC bus voltage, comparing the motor current to a reference current threshold and the DC bus voltage to a reference voltage threshold, respectively, decreasing the frequency reference in the command signal if the motor current is greater than the reference current threshold, and increasing the frequency reference in the command signal if the DC bus voltage is greater than the reference voltage threshold.

In accordance with yet another aspect of the invention, an AC motor drive to control transmission of voltage and current from an AC power source to an AC motor includes an input and an output connectable to an AC source and to an input terminal of the AC motor, respectively, a rectifier connected to the input, and a pulse width modulation (PWM) inverter connected to the rectifier by way of a DC bus and having a plurality of switches therein to control current flow and terminal voltages in the AC motor. The AC motor drive also includes a control system connected to the PWM inverter and configured to determine each of a root mean square (RMS) current applied to the AC motor and a voltage of the DC bus and compare the RMS current and the DC bus voltage to a reference current threshold and a reference voltage threshold, respectively. The control system is further configured to determine a first frequency offset based on the comparison of the RMS current value to the reference current threshold, determine a second frequency offset based on the comparison of the DC bus voltage to the reference voltage threshold, combine the first frequency offset and the second frequency offset to determine a composite frequency offset, and generate a modified frequency reference in the command signal based on the composite frequency offset.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION OF THE PREFERRED EMBODIMENT

The embodiments of the invention set forth herein relate to a system and method for controlling operation of a motor drive during fast start-up of an induction motor. A motor drive is controlled so as achieve a smooth start-up of the induction machine without disrupting the operation thereof due to over-current and over-voltage trip faults.

Figure 1:
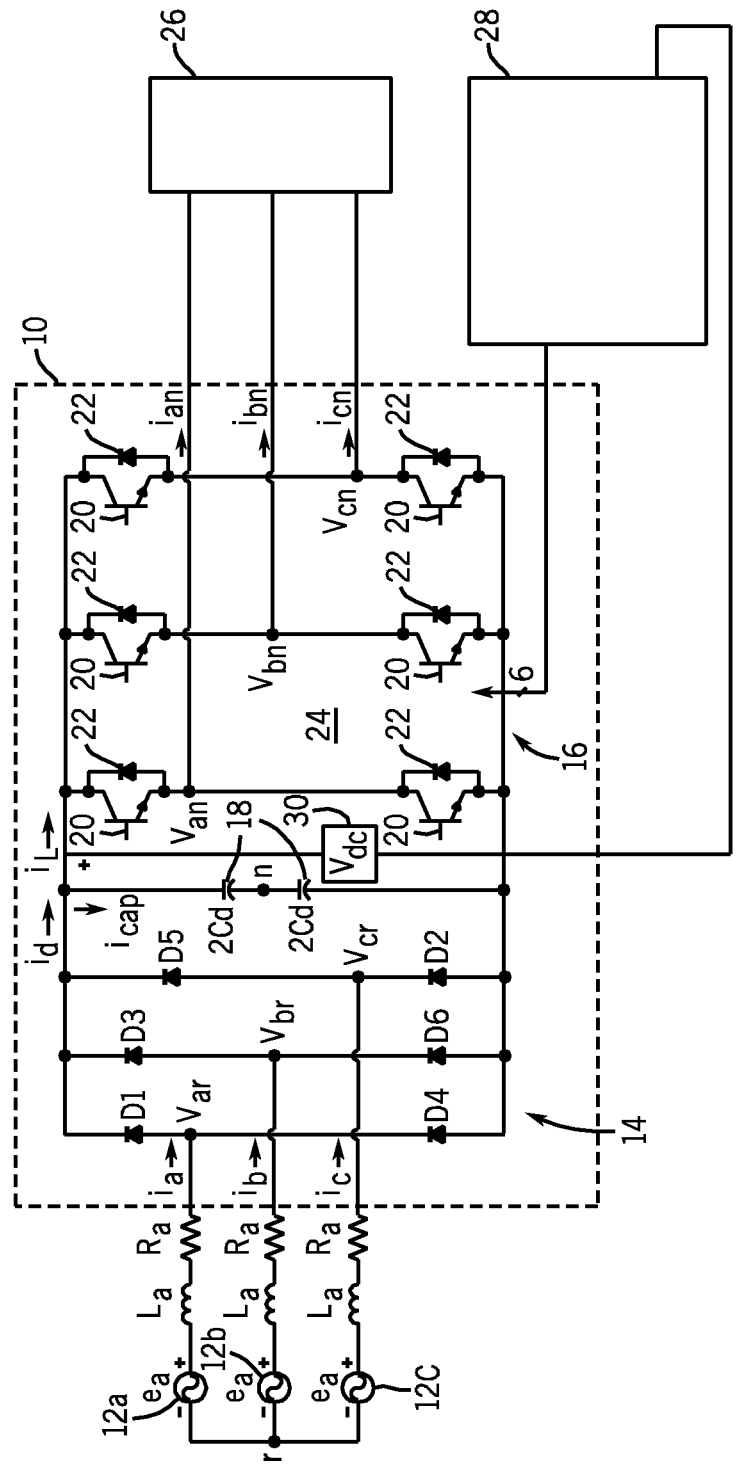
FIG. 1 a schematic of an AC motor drive according to one aspect of the invention.

Embodiments of the invention are directed to AC motor drives encompassing a plurality of structures and control schemes. The general structure of an AC motor drive 10 is shown in FIG. 1. The motor drive 10 may be configured, for example, as an adjustable speed drive (ASD) designed to receive a three AC power input, rectify the AC input, and perform a DC/AC conversion of the rectified segment into a three-phase alternating voltage of variable frequency and amplitude that is supplied to a load. In a preferred embodiment, the ASD operates according to an exemplary volts-per-hertz characteristic. In this regard, the motor drive provides voltage and output frequency regulation in steady state and fast dynamic step load response over a full load range.

In an exemplary embodiment, a three-phase AC input 12a-12c is fed to a three-phase rectifier bridge 14. The input line impedances are equal in all three phases. The rectifier bridge 14 converts the AC power input to a DC power such that a DC bus voltage is present between the rectifier bridge 14 and a switch array 16. The bus voltage is smoothed by a DC bus capacitor bank 18. The switch array 16 is comprised of a series of IGBT switches 20 and anti-parallel diodes 22 that collectively form a PWM inverter 24. The PWM inverter 24 synthesizes AC voltage waveforms with a fixed frequency and amplitude for delivery to a load, such as an induction motor 26. Operation of the inverter 24 is via a control system 28, which may further be comprised of a plurality of PI controllers. The control system 28 interfaces to the PWM inverter 24 via gate drive signals and sensing of the DC bus voltage and pole currents (by way of voltage sensor(s) 30 for example) such that changes in DC bus voltage can be sensed. These voltage changes can be interpreted as transient load conditions and are used to control switching of the switch array 16 of PWM inverter 24 such that near steady-state load conditions are maintained.

In operation, motor control 10 may be employed to provide a fast start-up of induction motor 26. In such a fast start-up, the motor control 10 is operated so as to cause motor 26 to accelerate up to a desired reference speed. This acceleration time can be as fast as 0.1 seconds, for example, from the motor's zero speed to the desired reference speed. Responsive to a desired speed input to control system 28, control system 28 generates a command signal for controlling a switching time of switch array 16 in PWM inverter 24 so as to output AC voltage waveforms with a desired frequency and amplitude to induction motor 26 that cause the motor to accelerate up to the desired reference speed. Included in the command signal are a frequency reference component and a voltage reference component that control operation of switch array 16 in PWM inverter 24. Control system 28 functions to convert the desired speed to a frequency reference component of the command signal. Additionally, control system 28 functions to multiply the frequency reference by a Volts/Hertz characteristic ratio of the motor 26 to provide the corresponding voltage reference to the inverter.

Figure 2:
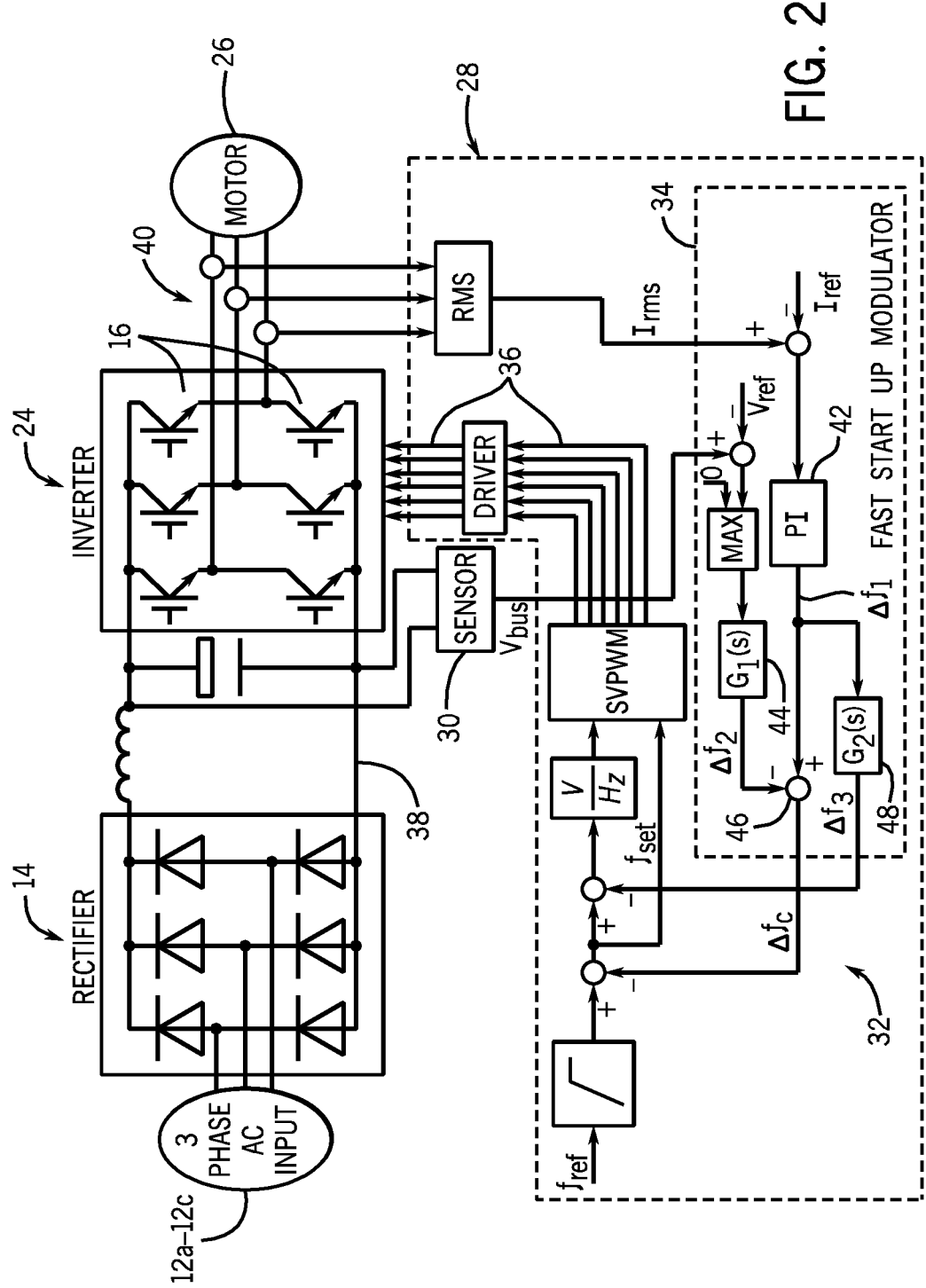
FIG. 2 is a schematic view of a fast start-up control scheme for the motor drive of FIG. 1 according to an embodiment of the invention.

Referring now to FIG. 2, a control scheme 32 of motor drive 10 is set forth for implementing a fast-start up of induction motor 26, according to an embodiment of the invention. In an exemplary embodiment for the fast start-up scheme 32, the control system 28 of motor drive 10 includes a fast start-up modulator 34 that implements an algorithm that functions to incrementally adjust the frequency reference of the command signal 36 based on a current applied to the induction motor 26 and a DC bus voltage present between the rectifier 14 and PWM inverter 24 of motor control 10 (i.e., voltage on the DC bus 38). In operation, control system 28 initiates the fast start-up scheme 32 by generating a frequency reference and voltage reference for the command signal based on a speed command and acceleration time received from an input device (not shown). Upon initiation of the fast start-up of induction motor 26, the three-phase current applied to the AC motor and the DC bus voltage are monitored, such as by way of current sensors 40 and voltage sensors 30. The measured three-phase current and DC bus voltage are received by fast start-up modulator 34, which functions to process the received current and voltage values, such as by determining the root mean square (RMS) current, $I_{rms}$, applied to induction motor 26, for example. The fast start-up modulator 34 then subsequently determines what, if any, frequency offsets to apply to the frequency reference, $f_{ref}$, of the command signal based on the determined RMS current $I_{rms}$ and DC bus voltage, $V_{bus}$, so as to incrementally adjust the frequency reference $f_{ref}$ of the command signal 36 during the fast start-up operation, as set forth in detail below.

Figure 3:
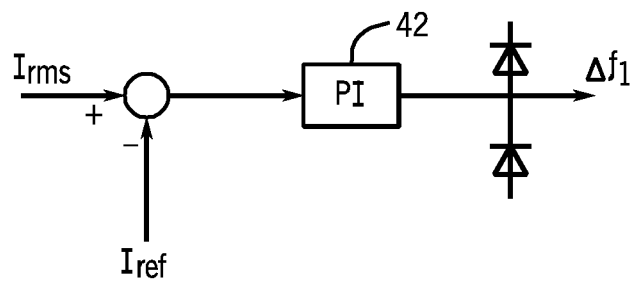
FIG. 3 is a detailed schematic view of a current based control component of the control scheme of FIG. 2.

In operation, fast start-up modulator 34 compares the measured RMS current $I_{rms}$ to a pre-determined reference current threshold, $I_{ref}$, set on the modulator 34. According to embodiments of the invention, the reference current threshold $I_{ref}$ can be set to a value less than or equal to a current value set to cause an over-current trip fault in the induction motor 26. In performing the comparison of the measured RMS current $I_{rms}$ to the pre-determined reference current threshold $I_{ref}$, fast start-up modulator 34 employs a proportional-integral (PI) controller 42, according to one embodiment of the invention. As shown in FIG. 2 and in detail in FIG. 3, the PI controller 42 performs the comparison of the measured RMS current $I_{rms}$ to the pre-determined reference current threshold $L_{ref}$, in order to determine if any adjusting of the process control inputs to PWM inverter 24 is needed—that is if any adjusting of the frequency reference $f_{ref}$ in the command signal 36 is needed. This adjusting of the frequency reference $f_{ref}$ is achieved by PI controller 42 by generating a first frequency offset, $\Delta f_1$, that is applied to the frequency reference component $f_{ref}$ of the command signal.

In determining the first frequency offset, $\Delta f_1$, if the PI controller 42 determines that the measured RMS current $I_{rms}$ is less than the pre-determined reference current threshold $I_{ref}$ then the first frequency offset $\Delta f_1$ is set by PI controller 42 to have a zero value. That is, as the measured RMS current $I_{rms}$ is determined to be at a level less than the reference current threshold $I_{ref}$, it is determined that there is no danger of an over-current trip fault occurring and that there is thus no need to adjust the frequency reference $f_{ref}$ in the command signal output by control system 28 to PWM inverter 24. If, however, the PI controller 42 determines that the measured RMS current $I_{rms}$ is greater than the pre-determined reference current threshold $I_{ref}$, then the first frequency offset $\Delta f_1$ is set by PI controller 42 to have a non-zero value. That is, the first frequency offset, $\Delta f_1$, is set to have a value greater than zero ($\Delta f_1 > 0$). When the first frequency offset $\Delta f_1$ is set to a value greater than zero, the $\Delta f_1$ functions to cause the frequency reference of the command signal 36 to be decreased, which in turn modifies the switching of switching array 16 in PWM inverter 24 to affect the power output to induction motor 26. The decreasing of the frequency reference $f_{ref}$ of the command signal 36 provided by first frequency offset $\Delta f_1$ thus serves to reduce the RMS current $I_{rms}$ back down to a level equal to or less than the pre-determined reference current threshold $I_{ref}$ in order to prevent an over-current trip fault from occurring. According to an exemplary embodiment, the first frequency offset $\Delta f_1$ is set to such a level that the modified frequency reference of the command signal causes PWM inverter 24 to generate a power output to induction motor 26 having an RMS current $I_{rms}$ that is equal to the pre-determined reference current threshold $I_{ref}$, such that the output current maintains its highest allowable level, while the corresponding torque is used to accelerate the induction machine 26 during the fast start-up period.

Figure 4:
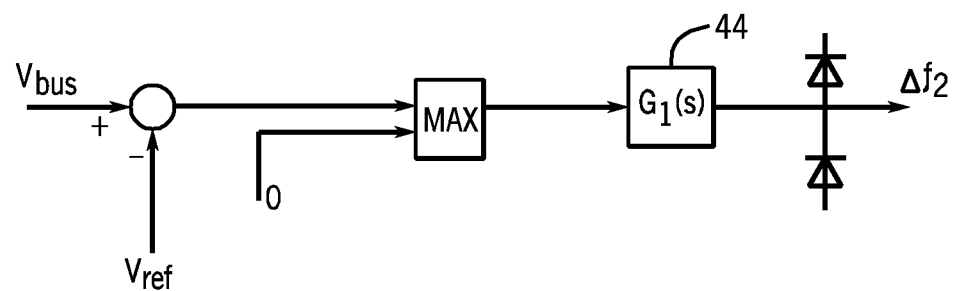
FIG. 4 is a detailed schematic view of a voltage based control component of the control scheme of FIG. 2.

As further shown in FIG. 2, the DC bus voltage $V_{bus}$ measured by voltage sensors 30 is provided to fast start-up modulator 34. Fast start-up modulator 34 then compares the measured DC bus voltage $V_{bus}$ to a pre-determined reference voltage threshold, $V_{ref}$, set on the modulator 34. According to embodiments of the invention, the voltage current threshold $V_{ref}$ can be set to a value less than or equal to a voltage value set to cause an over-voltage trip fault in the motor control 10. In performing the comparison of the measured DC bus voltage $V_{bus}$ to the pre-determined reference voltage threshold $V_{ref}$, fast start-up modulator 34 employs a transfer function 44 ($G_1(s)$), according to one embodiment of the invention. As shown in FIG. 2 and in detail in FIG. 4, the transfer function 44 compares the measured DC bus voltage $V_{bus}$ to the pre-determined reference voltage threshold $V_{ref}$ in order to determine if any adjusting of the frequency reference $f_{ref}$ in the command signal 36 transmitted to PWM inverter 24 is needed. This adjusting of the frequency reference $f_{ref}$ is achieved by transfer function 44 by generating a second frequency offset, $\Delta f_2$, that is applied to the frequency reference $f_{ref}$ in the command signal 36.

In determining the second frequency offset $\Delta f_2$, if the transfer function 44 determines that the measured DC bus voltage $V_{bus}$ is less than the pre-determined reference voltage threshold $V_{ref}$, then the second frequency offset $\Delta f_2$ is set by the transfer function 44 to have a zero value. That is, as the measured DC bus voltage $V_{bus}$ is determined to be at a level less than the reference voltage threshold $V_{ref}$, it is determined that there is no danger of an over-voltage trip fault occurring and that there is thus no need to adjust the frequency reference $f_{ref}$ in the command signal 36 output by control system 28 to PWM inverter 24. If, however, the transfer function 44 determines that the measured DC bus voltage $V_{bus}$ is greater than the pre-determined reference voltage threshold $V_{ref}$, then the second frequency offset $\Delta f_2$ is set by transfer function to have a non-zero value. That is, the second frequency offset $\Delta f_2$ is set to have a value less than zero ($\Delta f_2 < 0$). When the second frequency offset $\Delta f_2$ is set to a value less than zero, the $\Delta f_2$ functions to cause the frequency reference $f_{ref}$ of the command signal 36 to be increased, which in turn modifies the switching of switching array 16 in PWM inverter 24 to affect the power output to induction motor 26.

The increasing of the frequency reference $f_{ref}$ of the command signal 36 provided by second frequency offset $\Delta f_2$ causes the energy flow from induction motor 26 back to PWM inverter 24 to decrease, such that the DC bus voltage will be limited at a reasonable level. That is, the second frequency offset $\Delta f_2$ is set to such a level that upon the induction motor 26 nearing and/or reaching the desired reference speed, the synchronous frequency of the frequency reference $f_{ref}$ is increased to such a level that induction motor 26 is prevented from entering into power generating mode or, in the event of the induction machine 26 entering into the power generating mode, that the induction motor is changed back into motoring operation mode as soon as possible. This in turn reduces the DC bus voltage $V_{bus}$ back down to a level equal to or less than the pre-determined reference voltage threshold $V_{ref}$ in order to prevent an over-voltage trip fault from occurring.

Upon determination of the first frequency offset $\Delta f_1$ and the second frequency offset $\Delta f_2$, fast start-up modulator 34 is programmed to determine a composite frequency offset, $\Delta f_c$, that is output from the fast start-up modulator 34, indicated at point 46. The composite frequency offset $\Delta f_c$ is determined by subtracting $\Delta f_2$ from $\Delta f_1$, according to:

$$\Delta f_c = \Delta f_1 - \Delta f_2 \qquad \text{[Eqn. 1]}.$$

The composite frequency offset $\Delta f_c$ thus takes into account any frequency offsets that are desired to be made to the frequency reference $f_{ref}$ based on both the measured RMS current $I_{rms}$ and the measured DC bus voltage $V_{bus}$.

Upon determination of the composite frequency offset $\Delta f_c$, the control system 28 functions to subtract the composite frequency offset $\Delta f_c$ from frequency reference $f_{ref}$ so as to modify a frequency value of the frequency reference (i.e., generate a modified frequency reference, $f_{set}$) in the command signal 36 applied to PWM inverter 24. The modified frequency reference $f_{set}$ is determined by subtracting $\Delta f_c$ from $f_{ref}$ according to $$f_{set} = f_{ref} - \Delta f_c \qquad \text{[Eqn. 2]}.$$

Accordingly, in the event that the first frequency offset $\Delta f_1$ is greater than the second frequency offset $\Delta f_2$, then the modified frequency reference $f_{set}$ will have a frequency value that is decreased as compared to the initial frequency reference $f_{ref}$ prior to application of the composite frequency offset $\Delta f_c$ thereto. Conversely, in the event that the second frequency offset $\Delta f_2$ is greater than the first frequency offset $\Delta f_1$, then the modified frequency reference $f_{set}$ will have a frequency value that is increased as compared to the initial frequency reference $f_{ref}$ prior to application of the composite frequency offset $\Delta f_c$ thereto.

The modified frequency reference $f_{set}$ forms a component of the command signal generated by control system 28 along with a voltage reference component of the command signal 36 that is determined by multiplying the modified frequency reference $f_{set}$ by a Volts/Hertz characteristic ratio of the induction motor 26. The resulting command signal 36 generated by control system 28, including the modified frequency reference $f_{set}$ and the voltage reference, determines a particular space vector modulation (SVM) control scheme that is provided to PWM inverter 24 for controlling the switching time of switch array 16. Accordingly, AC voltage waveforms with a desired frequency and amplitude are output to induction motor 26 that cause the motor to accelerate up to the desired reference speed, while maintaining the RMS current $I_{rms}$ and the DC bus voltage $V_{bus}$ below the identified over-current trip fault set-point and over-voltage trip fault set-point.

In operation, the fast start-up modulator 34 is programmed to incrementally adjust/update a value of the composite frequency offset $\Delta f_c$ output therefrom during the course of the fast start-up period of induction motor 26. The RMS current $I_{rms}$ and the DC bus voltage $V_{bus}$ are monitored throughout the fast start-up period of operation, such that any changes in the RMS current $I_{rms}$ and/or the DC bus voltage $V_{bus}$ are reflected in updated values for the first frequency offset $\Delta f_1$ and the second frequency offset $\Delta f_2$, (and the resulting composite frequency offset $\Delta f_c$) output by the fast start-up modulator 34 for altering the frequency reference $f_{ref}$ component of the command signal to a desired modified frequency reference $f_{set}$.

It is recognized that additional elements can be provided for control scheme 32 to provide for a smooth fast start-up process. For example, as shown in FIG. 2, fast start-up modulator 34 can also includes a high-pass filter 48 ($G_2(s)$) that generates an offset, $\Delta f_3$, that is applied to the command signal 36 generated by control system 28. The application of the offset, $\Delta f_3$, in conjunction with the application of the composite frequency offset $\Delta f_c$, provides for a smooth, fast start-up process of induction motor 26.

Figure 5:
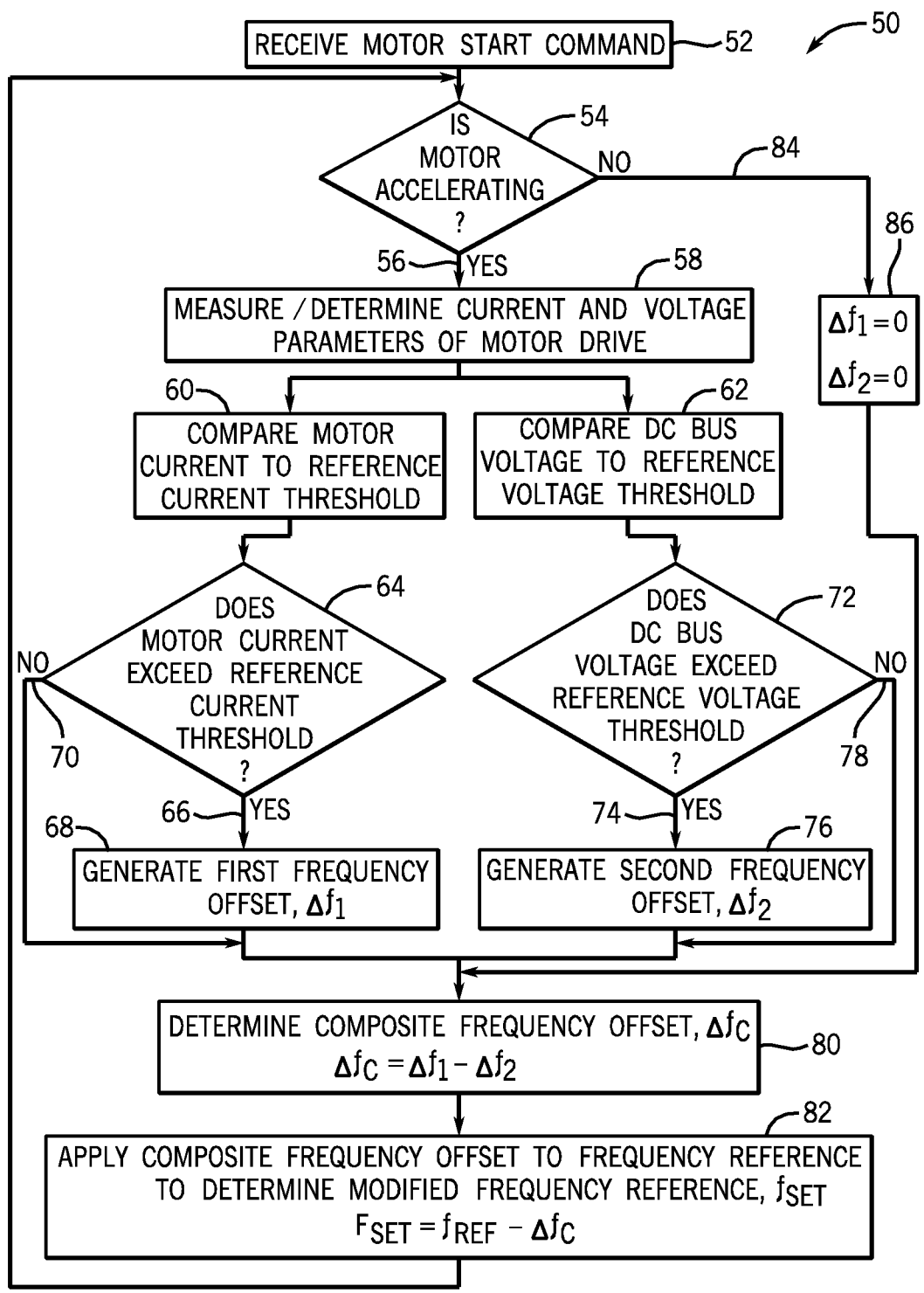
FIG. 5 is a flow chart illustrating a computer implemented technique for performing a fast start-up of an induction motor according to an embodiment of the invention.

Referring now to FIG. 5, and with continued reference to FIG. 2, a computer implemented technique 50 for controlling operation of motor drive 10 during fast start-up of induction motor 26 is set forth. The technique can, for example, be implemented via an algorithm performed by fast start-up modulator 34 of control system 28. The technique 50 begins at STEP 52 where a start command for the induction motor 26 is received. Associated with the start command is a generation of a command signal 36 having a frequency reference component and voltage reference component therein, with the particulars of the command signal being based on a user input of a desired speed at which the motor 26 is to be operated. An initial determination is then made at STEP 52 as to whether the motor is currently accelerating. If the motor is determined to be accelerating 56, then technique continues at STEP 58 by measuring and/or determining current and voltage parameters of the motor drive 10 that are resultant from the input of the particular command signal 36 to the PWM inverter 24 therein. That is, the root mean square (RMS) of the three-phase current applied to the induction motor, $I_{rms}$, and the DC bus voltage of the motor drive, $V_{bus}$, are determined.

In next STEPS 60, 62 of technique 50, the RMS current $I_{rms}$ and DC bus voltage $V_{bus}$ are received by fast start-up modulator 34 of control system 28 and are compared to a pre-determined reference current threshold, $I_{ref}$, and a pre-determined reference voltage threshold, $V_{ref}$, respectively. According to embodiments of the invention, the reference current threshold $I_{ref}$ can be set to a value less than or equal to a current value set to cause an over-current trip fault in the induction motor 26 and the reference voltage threshold $V_{ref}$ can be set to a value less than or equal to a voltage value set to cause an over-voltage trip fault in the motor control.

A determination is made at STEP 64 as to whether the measured RMS current $I_{rms}$ exceeds a pre-determined reference current threshold $I_{ref}$ in order to determine if any adjusting of the process control inputs to PWM inverter 24 is needed—that is, if any adjusting of the frequency reference $f_{ref}$ in the command signal 36 is needed based on the measured current. According to an exemplary embodiment of the invention, in performing the comparison of the measured RMS current $I_{rms}$ to the pre-determined reference current threshold $I_{ref}$, fast start-up modulator 34 employs a proportional-integral (PI) controller 42. If it is determined that the measured RMS current $I_{rms}$ exceeds the pre-determined reference current threshold $I_{ref}$ 66, then the fast start-up modulator 34 functions to generate a first frequency offset, $\Delta f_1$, at STEP 68 to be applied to the frequency reference $f_{ref}$ in the command signal 36 to provide for adjustment of the frequency reference. Alternatively, if it is determined that the measured RMS current $I_{rms}$ does not exceed the pre-determined reference current threshold $I_{ref}$ 70, then the technique 50 determines that no adjustment of the frequency reference $f_{ref}$ is needed. In the embodiment of technique 50 illustrated in FIG. 5, the technique 50 would thus continue by bypassing STEP 68. According to another embodiment of the invention, the technique 50 could also set a first frequency offset $\Delta f_1$ generated by fast start-up modulator 34 to zero (i.e., a zero offset), such that no adjustment/offset is applied to the frequency reference $f_{ref}$.

Concurrently with the determination made at STEP 64 as to whether the measured RMS current $I_{rms}$ exceeds the pre-determined reference current threshold $I_{ref}$, the technique also determines at STEP 72 whether the measured DC bus voltage $V_{bus}$ exceeds the pre-determined reference voltage threshold $V_{ref}$, in order to determine if any adjusting of the process control inputs to PWM inverter 24 is needed—that is, if any adjusting of the frequency reference $f_{ref}$ in the command signal 36 is needed based on the measured voltage. According to an exemplary embodiment of the invention, in performing the comparison of the measured DC bus voltage $V_{bus}$ to the pre-determined reference voltage threshold $V_{ref}$, fast start-up modulator 34 employs a transfer function ($G_1(s)$) 44. If it is determined that the measured DC bus voltage $V_{bus}$ exceeds the pre-determined reference voltage threshold $V_{ref}$ 74, then the fast start-up modulator 34 functions to generate a second frequency offset, $\Delta f_2$, at STEP 76 to be applied to the frequency reference $f_{ref}$ in the command signal 36 to provide for adjustment of the frequency reference. Alternatively, if it is determined that the measured DC bus voltage $V_{bus}$ does not exceed the pre-determined reference voltage threshold $V_{ref}$ 78, then the technique 50 determines that no adjustment of the frequency reference $f_{ref}$ is needed. In the embodiment of technique 50 illustrated in FIG. 5, the technique 50 would thus continue by bypassing STEP 76. According to another embodiment of the invention, the technique 50 could also set a second frequency offset $\Delta f_2$ generated by fast start-up modulator 34 to zero (i.e., a zero offset), such that no adjustment/offset is applied to the frequency reference $f_{ref}$.

Referring still to FIG. 5, upon determination of any first frequency offset $\Delta f_1$ and the second frequency offset $\Delta f_2$ at STEPS 68, 76, technique 50 continues at STEP 80 where fast start-up modulator 34 determines a composite frequency offset, $\Delta f_c$, that is to be output therefrom. The composite frequency offset $\Delta f_c$ is determined by subtracting $\Delta f_2$ from $\Delta f_1$, and thus the composite frequency offset $\Delta f_c$ takes into account any frequency offsets that are desired to be made to the frequency reference $f_{ref}$ based on both the measured RMS current $I_{rms}$ and the measured DC bus voltage $V_{bus}$.

Upon determination of the composite frequency offset $\Delta f_c$, technique 50 continues at STEP 82, where the composite frequency offset $\Delta f_c$ is applied to, and subtracted from, the frequency reference $f_{ref}$ so as to modify a frequency value of the frequency reference (i.e., generate a modified frequency reference, $f_{set}$) in the command signal 36 applied to the PWM inverter 24. Accordingly, in the event that the first frequency offset $\Delta f_1$ is greater than the second frequency offset $\Delta f_2$, then the modified frequency reference $f_{set}$ will have a frequency value that is decreased as compared to the initial frequency reference $f_{ref}$ prior to application of the composite frequency offset $\Delta f_c$ thereto. Conversely, in the event that the second frequency offset $\Delta f_2$ is greater than the first frequency offset $\Delta f_1$, then the modified frequency reference $f_{set}$ will have a frequency value that is increased as compared to the initial frequency reference $f_{ref}$ prior to application of the composite frequency offset $\Delta f_c$ thereto.

As shown in FIG. 5, upon application of the composite frequency offset $\Delta f_c$ to the frequency reference $f_{ref}$ to generate a modified frequency reference, $f_{set}$, technique 50 continues by looping back to STEP 54, where a determination is again made as to whether the motor is currently accelerating. If the motor is determined to still be accelerating 56, the technique 50 then proceeds through another iteration of determining/generating an appropriate composite frequency offset $\Delta f_c$ to apply to the frequency reference $f_{ref}$ that will result in the PWM inverter generating an output power that maintains the RMS current $I_{rms}$ and the DC bus voltage $V_{bus}$ below the identified over-current trip fault set. Technique 50 thus provides for incremental adjusting/updating of the value of the composite frequency offset $\Delta f_c$ output therefrom during the course of the fast start-up period of induction motor 26.

In running through each iteration of technique 50, if it is determined at STEP 54 that the motor is not accelerating 84, then technique continues at STEP 86 where the first frequency offset $\Delta f_1$ and the second frequency offset $\Delta f_2$ are set to zero (i.e., zero offset). The technique 50 then continues at STEPS 80, 82 where the composite frequency offset $\Delta f_c$ would thus be zero and the modified frequency reference $f_{set}$ would be unchanged from the frequency reference $f_{ref}$.

Thus, according to embodiments of the invention, a control scheme and technique are provided for controlling operation of a motor drive during fast start-up of an induction motor. The RMS current $I_{rms}$ applied to the induction motor and the DC bus voltage $V_{bus}$ present on the DC bus of the motor control are monitored while the motor is accelerating during the fast start-up. A frequency offset is incrementally applied to the frequency reference component of the command signal generated by the control signal of the motor drive based on the RMS current $I_{rms}$ and the DC bus voltage $V_{bus}$ values, with the PWM inverter of the motor drive generating an output power responsive to the command signal containing the modified reference frequency component. The presence of the modified reference frequency component in the command signal causes the RMS current $I_{rms}$ and the DC bus voltage $V_{bus}$ present in the motor drive to be maintained below identified over-current and over-voltage trip fault settings, such that a smooth start-up of the induction machine is provided.

A technical contribution for the disclosed method and apparatus is that it provides for a computer implemented technique for controlling operation of a motor drive during fast start-up of an induction motor. The technique incrementally adjusts a value of a frequency offset applied to a reference frequency component of a command signal during the course of the fast start-up period of the induction motor, such that a motor current output by the motor drive and a DC bus voltage present in the motor drive are maintained below identified over-current and over-voltage trip fault settings and so as to ensure a smooth start-up of the induction motor.

Therefore, according to one embodiment of the present invention, a system to control operation of an AC motor includes an AC motor drive having an input connectable to an AC source and an output connectable to an input terminal of an AC motor, with the AC motor drive further including a rectifier connected to the input, a pulse width modulation (PWM) inverter connected to the rectifier by way of a DC bus and having a plurality of switches therein to control current flow and terminal voltages in the AC motor, and a control system connected to the PWM inverter being configured to generate a command signal to cause the PWM inverter to control an output of the AC motor drive corresponding to the input to the AC motor, with the command signal including a frequency reference and a voltage reference. The control system includes a start-up modulator that is selectively operable during a start-up acceleration of the AC motor to a desired reference speed, with the start-up modulator being programmed to determine each of a motor current applied to the AC motor and a voltage of the DC bus, generate a first frequency offset that causes the frequency reference of the command signal to be decreased when the motor current is greater than a reference current threshold, and generate a second frequency offset that causes the frequency reference of the command signal to be increased when the DC bus voltage is greater than a reference voltage threshold.

According to another embodiment of present invention, a method for controlling operation of an AC motor during acceleration of the AC motor in a start-up mode of operation by way of a motor drive includes the step of generating a command signal in a control system of the motor drive based on a desired speed of the AC motor, the command signal including a frequency reference and a voltage reference. The method also includes the steps of transmitting the command signal to a pulse width modulation (PWM) inverter of the motor drive to control an output of the PWM inverter so as to thereby control current flow and terminal voltages in the AC motor and incrementally adjusting the command signal transmitted to the PWM inverter during the start-up mode of operation based on a motor current applied to the AC motor and a voltage an a DC bus of the motor drive. The step of incrementally adjusting the command signal further includes determining each of the motor current applied to the AC motor and the DC bus voltage, comparing the motor current to a reference current threshold and the DC bus voltage to a reference voltage threshold, respectively, decreasing the frequency reference in the command signal if the motor current is greater than the reference current threshold, and increasing the frequency reference in the command signal if the DC bus voltage is greater than the reference voltage threshold.

According to yet another embodiment of the present invention, an AC motor drive to control transmission of voltage and current from an AC power source to an AC motor includes an input and an output connectable to an AC source and to an input terminal of the AC motor, respectively, a rectifier connected to the input, and a pulse width modulation (PWM) inverter connected to the rectifier by way of a DC bus and having a plurality of switches therein to control current flow and terminal voltages in the AC motor. The AC motor drive also includes a control system connected to the PWM inverter and configured to determine each of a root mean square (RMS) current applied to the AC motor and a voltage of the DC bus and compare the RMS current and the DC bus voltage to a reference current threshold and a reference voltage threshold, respectively. The control system is further configured to determine a first frequency offset based on the comparison of the RMS current value to the reference current threshold, determine a second frequency offset based on the comparison of the DC bus voltage to the reference voltage threshold, combine the first frequency offset and the second frequency offset to determine a composite frequency offset, and generate a modified frequency reference in the command signal based on the composite frequency offset.

The present invention has been described in terms of the preferred embodiment, and it is recognized that equivalents, alternatives, and modifications, aside from those expressly stated, are possible and within the scope of the appending claims.

What is claimed is:

1. A system to control operation of an AC motor, the system comprising:
    an AC motor drive having an input connectable to an AC source and an output connectable to an input terminal of an AC motor, the AC motor drive comprising:
        a rectifier connected to the input;
        a pulse width modulation (PWM) inverter connected to the rectifier by way of a DC bus and having a plurality of switches therein to control current flow and terminal voltages in the AC motor; and
        a control system connected to the PWM inverter and being configured to generate a command signal to cause the PWM inverter to control an output of the AC motor drive corresponding to the input to the AC motor, the command signal including a frequency reference and a voltage reference;
    wherein the control system includes a start-up modulator that is selectively operable during a start-up acceleration of the AC motor to a desired reference speed, the start-up modulator being programmed to:
        determine each of a motor current applied to the AC motor and a voltage of the DC bus;
        generate a first frequency offset that causes the frequency reference of the command signal to be decreased when the motor current is greater than a reference current threshold; and
        generate a second frequency offset that causes the frequency reference of the command signal to be increased when the DC bus voltage is greater than a reference voltage threshold.

2. The system of claim 1 wherein the start-up modulator generates a first frequency offset having a non-zero value when the motor current is greater than the reference current threshold and generates a first frequency offset having a zero value when the motor current is less than the reference current threshold.

3. The system of claim 1 wherein the start-up modulator generates a second frequency offset having a non-zero value when the DC bus voltage is greater than the reference voltage threshold and generates a second frequency offset having a zero value when the DC bus voltage is less than the reference voltage threshold.

4. The system of claim 1 wherein the start-up modulator is configured to subtract the second frequency offset from the first frequency offset to generate a composite frequency offset.

5. The system of claim 1 wherein the control system is configured to subtract the composite frequency offset from the frequency reference so as to generate a command signal having a modified frequency reference.

6. The system of claim 5 wherein the modified frequency reference has a frequency value that is decreased as compared to the frequency reference when the first frequency offset is greater than the second frequency offset.

7. The system of claim 5 wherein the modified frequency reference has a frequency value that is increased as compared to the frequency reference when the second frequency offset is greater than the first frequency offset.

8. The system of claim 5 wherein the control system is configured to determine a space vector modulation (SVM) control scheme based on the command signal, so as to provide a switching pattern for the plurality of switches in the PWM inverter and control a frequency of AC power input to the AC motor.

9. The system of claim 1 wherein the start-up modulator is configured to incrementally update the first and second frequency offsets during start-up of the AC motor.

10. The system of claim 1 wherein the start-up modulator is configured to generate the first frequency offset during acceleration of the AC motor and generate the second frequency offset upon the AC motor reaching the desired reference speed.

11. The system of claim 1 wherein the motor current comprises a root mean square (RMS) current.

12. The system of claim 1 wherein the start-up modulator further comprises a high-pass filter.

13. A method for controlling operation of an AC motor during acceleration of the AC motor in a start-up mode of operation by way of a motor drive, the method comprising:
    generating a command signal in a control system of the motor drive based on a desired speed of the AC motor, the command signal including a frequency reference and a voltage reference;
    transmitting the command signal to a pulse width modulation (PWM) inverter of the motor drive to control an output of the PWM inverter, thereby controlling current flow and terminal voltages in the AC motor; and
    incrementally adjusting the command signal transmitted to the PWM inverter during the start-up mode of operation based on a motor current applied to the AC motor and a voltage an a DC bus of the motor drive, wherein incrementally adjusting the command signal comprises:
        determining each of the motor current applied to the AC motor and the DC bus voltage;
        comparing the motor current to a reference current threshold and the DC bus voltage to a reference voltage threshold, respectively;
        decreasing the frequency reference in the command signal if the motor current is greater than the reference current threshold; and
        increasing the frequency reference in the command signal if the DC bus voltage is greater than the reference voltage threshold.

14. The method of claim 13 wherein incrementally adjusting the command signal further comprises:
    generating a first frequency offset if the motor current is greater than the reference current threshold; and
    generating a second frequency offset if the DC bus voltage is greater than the reference voltage threshold.

15. The method of claim 14 wherein incrementally adjusting the command signal further comprises:
    subtracting the second frequency offset from the first frequency offset to generate a composite frequency offset; and
    subtracting the composite frequency offset from the frequency reference so as to generate a command signal having a modified frequency reference.

16. The method of claim 14 further comprising:
    setting the first frequency offset to zero if the motor current is less than the reference current threshold; and
    setting the second frequency offset to zero if the DC bus voltage is less than the reference voltage threshold.

17. An AC motor drive to control transmission of voltage and current from an AC power source to an AC motor, the AC motor drive comprising:

an input and an output connectable to an AC source and to an input terminal of the AC motor, respectively;

a rectifier connected to the input;

a pulse width modulation (PWM) inverter connected to the rectifier by way of a DC bus and having a plurality of switches therein to control current flow and terminal voltages in the AC motor; and a control system connected to the PWM inverter and configured to:

determine each of a root mean square (RMS) current applied to the AC motor and a voltage of the DC bus;

compare the RMS current and the DC bus voltage to a reference current threshold and a reference voltage threshold, respectively;

determine a first frequency offset based on the comparison of the RMS current value to the reference current threshold;

determine a second frequency offset based on the comparison of the DC bus voltage to the reference voltage threshold;

combine the first frequency offset and the second frequency offset to determine a composite frequency offset; and generate a modified frequency reference in the command signal based on the composite frequency offset.

18. The AC motor drive of claim 17 wherein the modified frequency reference has a frequency value that is decreased as compared to the frequency reference when the first frequency offset is greater than the second frequency offset.

19. The AC motor drive of claim 17 wherein the modified frequency reference has a frequency value that is increased as compared to the frequency reference when the second frequency offset is greater than the first frequency offset.

20. The AC motor drive of claim 17 wherein the control system is further configured to:

set the first frequency offset to zero if the RMS current is less than the reference current threshold; and set the second frequency offset to zero if the DC bus voltage is less than the reference voltage threshold.

\* \* \* \* \*